(12) United States Patent
Nicolai

(10) Patent No.: US 6,354,604 B1
(45) Date of Patent: Mar. 12, 2002

(54) SEALING ASSEMBLY

(75) Inventor: Michael Nicolai, Offenbach (DE)

(73) Assignee: GKN Lobro GmbH (DE)

( * ) Notice: Subject to any disclaimer, the term of this patent is extended or adjusted under 35 U.S.C. 154(b) by 0 days.

(21) Appl. No.: 09/458,777

(22) Filed: Dec. 10, 1999

(30) Foreign Application Priority Data

Dec. 12, 1998 (DE) ........................................ 198 57 460

(51) Int. Cl.$^7$ .............................. F16J 15/02; F16D 3/64
(52) U.S. Cl. ....................... 277/641; 277/642; 277/312; 464/906; 464/143
(58) Field of Search .................................. 277/312, 316, 277/628, 637, 641, 642; 464/139, 142, 143, 145, 146, 906, 175, 15

(56) References Cited

U.S. PATENT DOCUMENTS

| | | | |
|---|---|---|---|
| 3,106,077 A | * | 10/1963 | Sharp |
| 3,204,427 A | * | 9/1965 | Dunn |
| 3,541,809 A | * | 11/1970 | Howey |
| 3,633,382 A | * | 1/1972 | Westercamp |
| 4,004,435 A | * | 1/1977 | Rubin |
| 4,436,310 A | | 3/1984 | Sawabe et al. |
| 4,909,774 A | * | 3/1990 | Muller |
| 5,318,480 A | * | 6/1994 | Essi et al. |
| 5,334,096 A | * | 8/1994 | Iwao |
| 5,582,415 A | | 12/1996 | Yoshida et al. |

FOREIGN PATENT DOCUMENTS

| | | |
|---|---|---|
| DE | 1 223 200 | 8/1966 |
| DE | 32 10 389 A1 | 4/1983 |
| DE | 89 13 556 U1 | 2/1990 |
| DE | 44 26 792 A1 | 4/1995 |
| EP | 0 090 436 A2 | 10/1982 |
| EP | 0 646 714 A1 | 4/1995 |

OTHER PUBLICATIONS

Hydraulics & Pneumatics, 1965, p. 210.
Seals Reference Issue, Seals, Machine Design, Jun. 19, 1969, pp. 85–94.

* cited by examiner

*Primary Examiner*—Anthony Knight
*Assistant Examiner*—Vishal Patel

(57) ABSTRACT

A sealing assembly on a constant velocity universal joint which comprises an outer joint part with at least one aperture at an axial end, an inner joint part having a driveshaft connected thereto and being inserted into said outer joint part, and further comprising rolling members effective between the outer joint part and the inner joint part and serving the transmission of torque. The sealing assembly includes at least one sheet metal element having an annular face, which rests on an end face of the outer joint part, with the outer joint part and the sheet metal element being clamped to one another. A first face—the annular face or the end face—has a surface structure, with planar contact faces and grooves provided therein. The respective other face—the annular face or the end face—forms a planar counter face. Plastic-elastic sealing material is inserted between the annular face and the end face with the plastic-elastic sealing material—up to the point of contact between the planar contact faces and the planar counter face—being formed into the grooves of the surface structure.

7 Claims, 2 Drawing Sheets

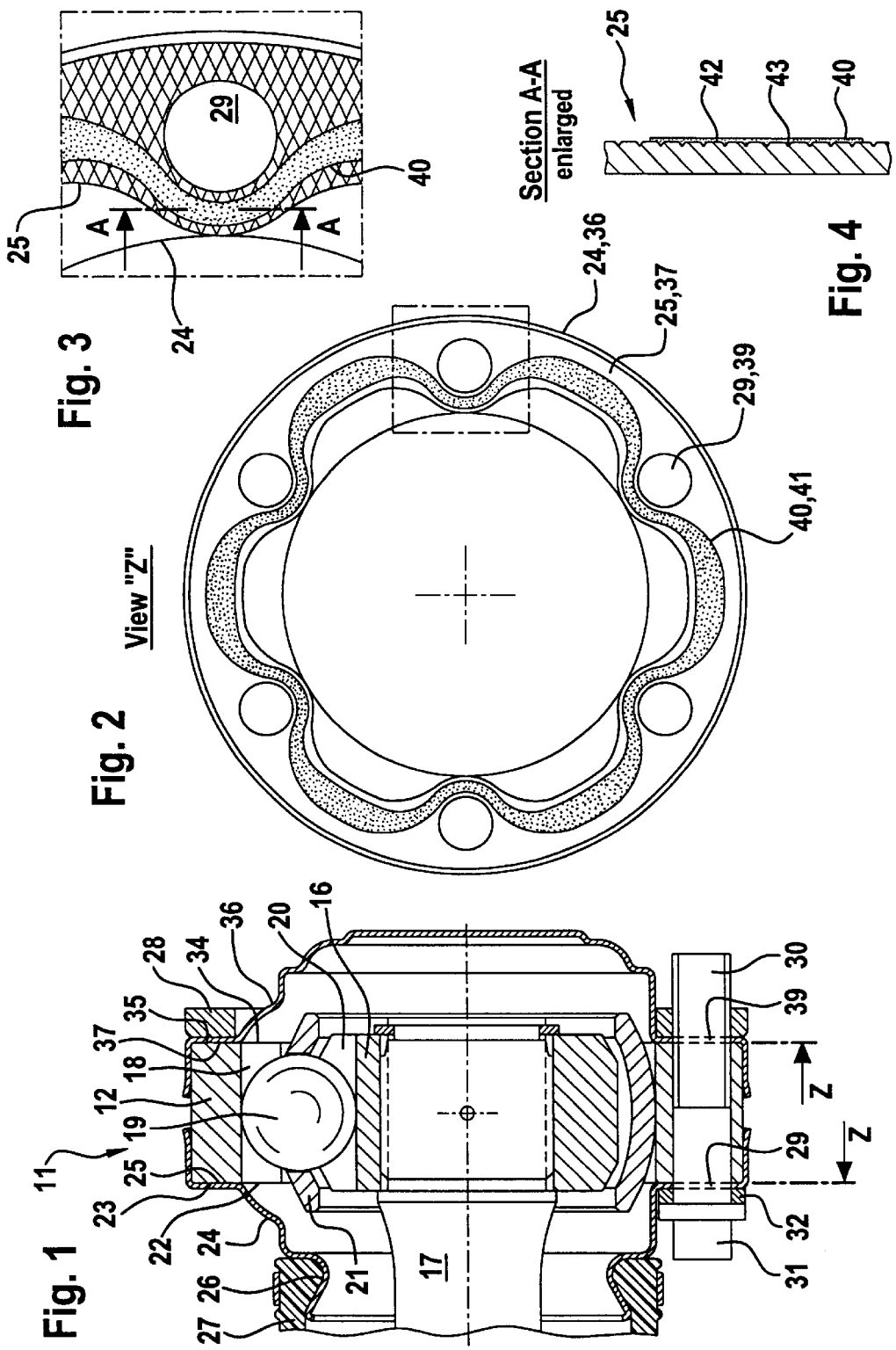

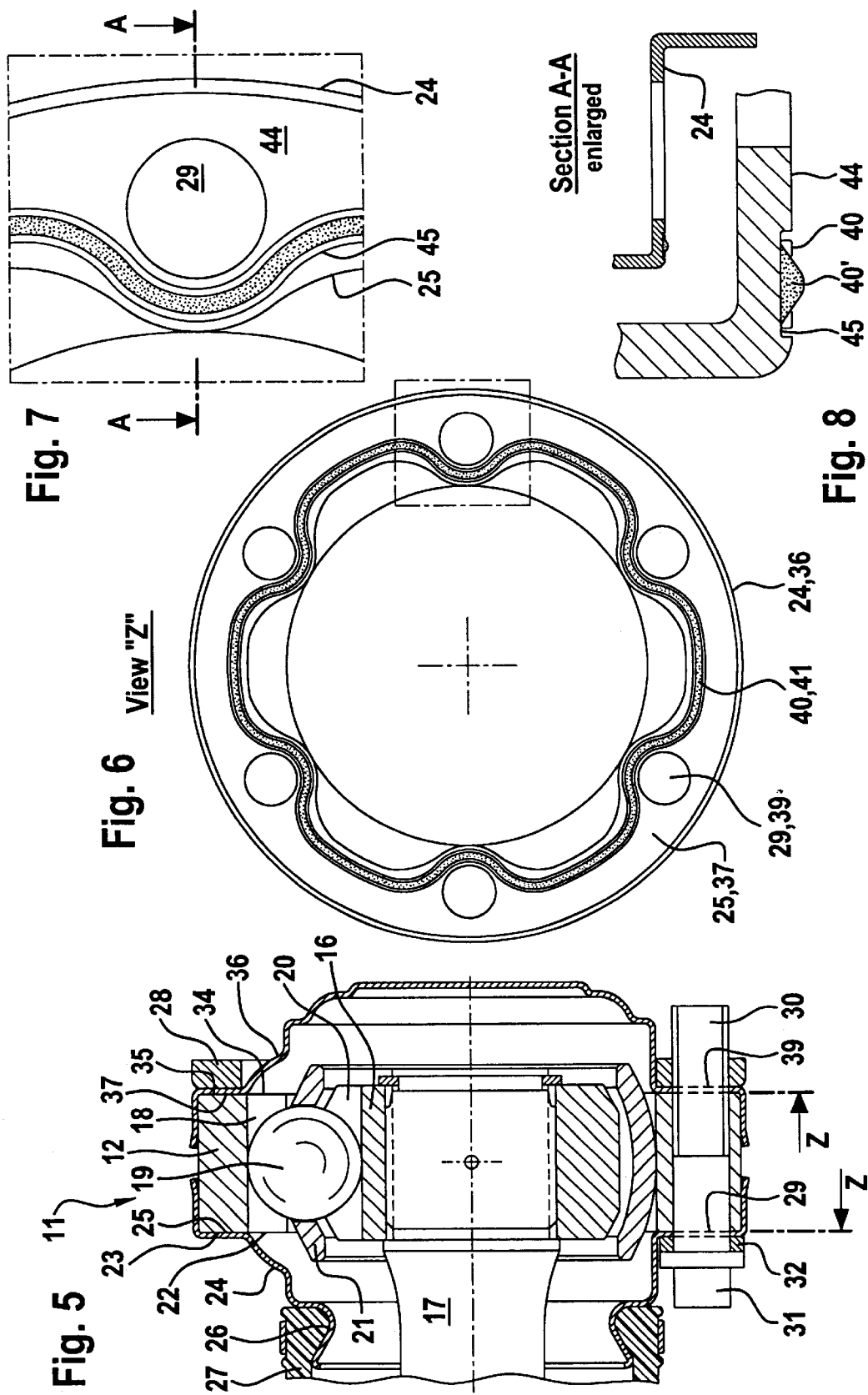

SEALING ASSEMBLY

BACKGROUND OF THE INVENTION

The invention relates to a sealing assembly on a constant velocity universal joint which comprises an outer joint part with at least one aperture at an axial end, an inner joint part having a driveshaft connected thereto and being inserted into said outer joint part, and further comprising rolling members effective between the outer joint part and the inner joint part and serving the transmission of torque, wherein at least one sheet metal element, by means of an annular face, rests on an end face of the outer joint part, with the outer joint part and the sheet metal element being clamped to one another.

Constant velocity universal joints in the present sense can be constant velocity universal ball joints or tripod joints or similar joints serving the transmission of torque. Constant velocity universal joints of said type are normally supplied by the manufacturer as integral parts of complete drive shafts consisting of a shaft shank and two joints mounted at the driveshaft ends. The joints comprise a grease filling and the respective outer joint parts are ready to be mounted on counter flanges. The outer joint parts are sealed relative to the shaft shank by convoluted boots. Said boots can be secured especially to sheet metal rings which, in turn, form annular faces which are to be bolted to end faces of the outer joint part. In the case of joints which, as so-called disc joints, comprise a second aperture, there are provided further sheet metal parts in the form of sheet metal covers which seal the joints not only during transport but also permanently in operation. For this purpose, the sheet metal covers are clamped in between the outer joint part and the flange. For sealing purposes elastic sealing elements are provided between the metallic faces which rest on one another. This is because the inaccurately machined metallic surfaces cannot, without fail, prevent the grease from emerging during operation under the influence of centrifugal forces when the grease is thin. Grease thinning occurs due to an increase in temperature. However, such elastic sealing elements which are arranged between metallic parts bolted to one another and which are under pre-tension are subject to a settling process. From this the, tensioning bolts lose some of their tensioning force, so that, in the final analysis, they can become loose. However, for safety reasons, it is important that such loosening of the bolts be avoided. In view of today's standards/requirements, subsequent tensioning of the bolts after a running-in phase is no longer acceptable.

SUMMARY OF THE INVENTION

It is therefore an object of the invention to provide a sealing assembly of said type which safely fulfills its sealing function, but which eliminates any settling symptoms after the clamping operation and avoids said consequential damage.

This and other objects and advantages are achieved by a sealing assembly having a first face—the annular face or the end face—including a surface structure with planar contact faces and recesses or grooves machine-produced therein, and the respective other face—the annular face or the end face—forming a planar counter face, with plastic-elastic sealing material being inserted between the annular face and the end face and with the plastic-elastic sealing material—up to the point of contact between the planar contact faces and the planar counter face—being formed into the recesses or grooves of the surface structure. After an initially planar surface has been produced, the recesses or grooves are formed into the planar surface. The plastic-elastic consistency of the sealing material guarantees complete sealing while compensating for surface inaccuracies in the annular face or in the opposed end face. By carrying out a tensioning operation until there exists metallic contact between the planar contact faces and the opposed planar face, any settlement of the plastic-elastic material is impossible. At the same time, the design of the planar contact faces and of the recesses or grooves ensures that there remains a continuous sealing ring—even if the sealing ring is punctually interrupted—so that there cannot occur any escape routes for the grease due to a partial destruction of the sealing ring.

In a first embodiment, the surface structure is produced by cross-knurling, as a result of which the areas positioned between the grooves produce the metallic contact, but the network formed by the crossed grooves produces an annularly closed sealing structure. Such knurling can also be applied to the end face of the outer joint part.

It can be particularly advantageous if the plastic-elastic sealing material is displaced radially inwardly or radially outwardly into a region where there exists a gap between the sheet metal element and the outer joint part, which gap is no longer interrupted by contact faces, so that there is obtained a widened, uninterrupted sealing ring.

In a second embodiment, the surface structure consists of a circumferential groove which is stamped into a planar contact face and which ensures complete annular sealing when the planar contact face is in contact with the counter face. The circumferential groove can be particularly easily stamped into the sheet metal cover.

In a preferred embodiment, the surface structure is produced in the sheet metal element which is easier to handle and consists of a softer material, in which case the end face of the outer joint part is planar. However, the present invention also allows a reversal of said geometric conditions.

If the sheet metal element forms the sheet metal ring for fixing a convoluted boot, the metallic contact with the contact faces of the surface structure preferably takes place in the region of the bolt heads of the tensioning bolts in order to eliminate any settling symptoms. If in the regions between each two bolt heads the applied sealing material is displaced to a lesser extent, this does not adversely influence the sealing effect.

If the sheet metal element forms the sheet metal cap between the outer joint part and the flange for sealing the outer joint part at the second aperture, it is important, however, to ensure a fully circumferential metallic contact between the contact faces and the counter face, i.e., especially the planar face of the outer joint part.

An inventive method of producing a sealing assembly in accordance with the invention consists in that a continuous ring consisting of a plastic-elastic sealing material is placed on to the annular surface or on to the end face and that, while the cover and/or the annular member, and the outer joint part and the flange are being clamped together, the sealing material is displaced until a metallic contact is established between the planar contact faces of the surface structure and the planar counter face. The sealing material can consist of a conventional high-viscosity plastic material which is applied to the grid-like annular face/circumferential groove or to the planar counter face in an annularly closed worm. The sealing material can, optionally, be a pressed out bead member whose thickness should have only a slight overdimension relative to the grid-like or grooved surface structure to be able to flow away under pressure in the indentations. Other objects and advantages of the invention will become apparent upon reading the following detailed description and appended claims, and upon reference to the accompanying drawings.

BRIEF DESCRIPTION OF THE DRAWINGS

For a more complete understanding of the invention, reference should now be made to the embodiments illustrated in greater detail in the accompanying drawings and described below by way of examples of the invention. In the drawings:

FIG. 1 shows an outer joint part with an inventive sealing assembly in a longitudinal section in a first embodiment.

FIG. 2 is a plan view of a sheet metal element at a sealing assembly according to FIG. 1 in one of the two drawn-in views "Z".

FIG. 3 shows an enlarged detail according to FIG. 2

FIG. 4 shows a section through the surface according to FIG. 3 along the sectional line A—A.

FIG. 5 shows an outer joint part with an inventive sealing assembly in a longitudinal section in a second embodiment.

FIG. 6 shows a plan view of a sheet metal element at a sealing assembly according to FIG. 5 in one of the two drawn-in views "Z".

FIG. 7 shows an enlarged detail according to FIG. 6.

FIG. 8 is a section through the surface according to FIG. 7 along the sectional line A—A.

DETAILED DESCRIPTION OF A PREFERRED EMBODIMENT

FIGS. 1 and 5 will be described jointly below. They show a crossed grooves (VL) constant velocity joint 11 with a disc-shaped outer joint part 12 which comprises two axial apertures. Inside the outer joint part 12, there is arranged an inner joint part 16 into which a driveshaft 17 is inserted in a rotationally fast way. In the outer joint part 12, there are shown outer ball grooves 18 and in the inner joint part 16, there are shown inner ball grooves 20. Said ball grooves 18, 20 accommodate balls 19 which are guided in an annular ball cage 21. The ball grooves 18, 20 deviate from the simplified illustration in that they are designed to be crossed at opposed crossing angels relative to the longitudinal axis A.

The outer joint part 12 and the inner joint part 16 can be articulated relative to one another around the joint center X, with the balls 19, by means of the ball cage 21, ensuring rotationally fast coupling between the outer joint part and the inner joint part. Furthermore, the outer joint part and the inner joint part 16 are axially displaceable relative to one another. When the joint is in the articulated condition, the balls sets themselves on to the angle-bisecting plane and, in the case of an axial displacement, they set themselves on to the center of the relative displacement path.

At the first aperture 22 of the outer joint part 22, a sheet metal ring 24 is placed on to the end face 23 of the outer joint part. The sheet metal ring 24 is provided with an annular groove 26 for receiving a convoluted boot 27. By way of its other end (not illustrated), the convoluted boot 27 is clamped on to the driveshaft 17. The sheet metal ring 24 is provided with an annular face 25 which cooperates with the end face 23 and it is clamped to the outer joint part 12 and to a flange 28 by way of tensioning bolts 30 inserted into bolt holes 29. Underneath the bolt heads 31, it is possible to identify discs 32. At the second aperture 34, the outer joint part 12 is provided with a second end face 35 on which there rests a sheet metal cover 36 by way of an annular face 37. In the region of the annular face 37, the sheet metal cover 36 is provided with bolt holes 39 and clamped in between the outer joint part 12 and the flange 28. Between the plate metal ring 24 and the end face 23, there is arranged a first sealing ring 40, with a second sealing ring 41 being provided between the sheet metal cover 36 and the end face 35.

FIGS. 2 to 4 show that the annular faces 25, 37 of the sheet metal elements as illustrated in view "Z" are interrupted by the bolts holes 29, 39 and each comprise a reduced width in the region of the ball grooves. Along their leaf-shaped inner edge, there is arranged a sealing ring 40, 41 consisting of a plastic-elastic material. As can be seen in the enlarged illustration of the sheet metal part 24, 36, the surface of the annular face 25, 37 is cross-knurled, which results in diamond-shaped contact faces 42 which are separated by intermediate grooves 43. During the sealing process, the material applied in a layer fully flows into the grooves, with any excess material being able to emerge from the open ends of the grooves. The diamond-shaped contact faces 42 come into contact with the end faces 22, 34 at the outer joint part 12. The plastic-elastic material of the annular seal 40, 41 is displaced into the grooves 43, with the outer joint part 12 and the flange 28 being in the fully clamped condition. In the knurled region, there is produced a closed interconnected network of sealing material. Thereafter, mechanical settlement of the seal 40, 41 is no longer possible, and any loosening of the bolts 30 due to settlement symptoms is thus eliminated.

FIGS. 6 to 8 show that the annular faces 25, 27 of the sheet metal elements as illustrated in view "Z" are interrupted by the bolt holes 29, 39 and each comprise a reduced width in the region of the ball grooves. Along their leaf-shaped inner edges, there is arranged a sealing ring 40, 41 consisting of a plastic-elastic material. As can be seen in the enlarged illustration of the sheet metal part 24, 36, the surface of the annular face 25, 37 is provided with a circumferential groove, which is stamped into the planar contact face 44. The contact face 44, which is raised relative to the deepened circumferential groove 45, comes to rest against the end faces 22, 34 of the outer joint part 12. The plastic-elastic material of the annular seal 41 is displaced into the initially only partially filled circumferential groove 45 while the outer joint part 12 and the flange 28 are in a fully clamped condition. As can be seen in the enlarged section A—A, the sealing material is applied in such a way that it initially projects beyond the raised contact face 44 (wedge-shaped profile 40'), but when displaced, it can be fully accommodated by the flat circumferential groove 45 (flat profile 40). Thereafter, mechanical settlement of the seal 40, 41 is no longer possible. Any loosening of the bolts 30 due to settlement symptoms is thus eliminated.

From the foregoing it can be seen that there has been brought to the art a new and improved sealing assembly having advantages over conventional sealing assemblies. While the invention has been described in connection with one or more embodiments, it is not intended to be limited thereto. To the contrary, the invention covers all alternatives, modifications and equivalents which may be included within the spirit and scope of the appended claims.

What is claimed is:

1. A sealing assembly on a constant velocity universal joint (11) the sealing assembly comprising:

an outer joint part (12) with at least one aperture (22, 34) at an axial end;

an inner joint part (16) having a driveshaft connected thereto and being inserted into said outer joint part (12); and a plurality of rolling members effective between the outer joint part (12) and the inner joint part (16) for the transmission of torque;

wherein at least one sheet metal element (24, 36) having an annular face (25, 37) rests on an end face (23, 35) of the outer joint part (12), with the outer joint part (12) and the sheet metal element (24,36) being clamped to one another; and wherein one of the annular face (25, 37) or the end face (23, 35) has a surface structure with planar contact faces (42, 44) and grooves (43, 45) therein, and wherein the respective other face forms a planar counter-face, with plastic-elastic sealing material (40, 41) being inserted between the annular face (24, 37) and the end face (23, 35), the plastic-elastic sealing material (40, 41) being formed, up to the point of contact between the planar contact faces (42, 44), into the grooves (43, 45) of the surface structure, wherein the grooves of the surface structure are produced by cross-knurling to form grid-like contact faces (42) and crossed grooves (43) which are formed in the end face (23, 35) of the outer joint part (12), and wherein the sealing material (40) is permanently capable of flowing under pressure.

2. A sealing assembly on a constant velocity universal joint (11) the sealing assembly comprising:

an outer joint part (12) with at least one aperture (22, 34) at an axial end;

an inner joint part (16) having a driveshaft connected thereto and being inserted into said outer joint part (12); and a plurality of rolling members effective between the outer joint part (12) and the inner joint part (16) for the transmission of torque;

wherein at least one sheet metal element (24, 36) having an annular face (25, 37) rests on an end face (23, 35) of the outer joint part (12), with the outer joint part (12) and the sheet metal element (24,36) being clamped to one another; and wherein one of the annular face (25, 37) or the end face (23, 35) has a surface structure with planar contact faces (42, 44) and grooves (43, 45) therein, and wherein the respective other face forms a planar counter-face, with plastic-elastic sealing material (40, 41) being inserted between the annular face (24, 37) and the end face (23, 35), the plastic-elastic sealing material (40, 41) being formed, up to the point of contact between the planar contact faces (42, 44), into the grooves (43, 45) of the surface structure, wherein the grooves of the surface structure comprise the continuous groove (45) which is stamped into a planar contact face (44) and is provided in the annular face (25, 37) of the sheet metal element and wherein the sealing material (41) is permanently capable of flowing under pressure.

3. A sealing assembly according to claim 1 or 2 wherein the sheet metal element is a sheet metal cover which seals a second aperture (34) at the axial other end of the outer joint part (12) and is clamped between an end face (35) of the outer joint part (12) and a flange (28).

4. A sealing assembly according to claim 1 or 2 wherein the sheet metal element is a sheet metal ring (24) which is provided with an annular groove (26) for fixing a convoluted boot (27) and which is clamped to an end face (23) of the outer Joint part (12) by tensioning bolts (30).

5. A method of producing a sealing assembly according to claim 1 or 2 wherein a continuous ring (40, 41) the plastic-elastic sealing material is placed between the annular face (25, 37) and the end face (23, 35) and the outer joint part (12) and a flange (28) are clamped together such that the plastic-elastic sealing material is formed into the grooves (43, 45) of the surface structure up to the point of a metallic contact between the planar contact faces (42, 44) of the surface structure and the planar counter face.

6. A method according to claim 5, wherein the plastic-elastic sealing material is pressed out onto the annular face (25, 37) or the end face (23, 35) such that during the clamping operation, the plastic-elastic sealing material is made to flow between the annular face (25, 37) and the end face (23, 35).

7. A method according to claim 5, wherein the plastic-elastic sealing material is inserted in the form of a prefabricated annular member between the annular face (25, 37) and the end face (23, 35) such that during the clamping operation, the plastic-elastic sealing material is made to flow between the annular face (25, 37) and the end face (23, 35).

* * * * *